J. W. WHITE, Jr.
BRONZE WORM GEAR MOUNTING.
APPLICATION FILED MAY 28, 1919.
1,422,512.
Patented July 11, 1922.
3 SHEETS—SHEET 2.
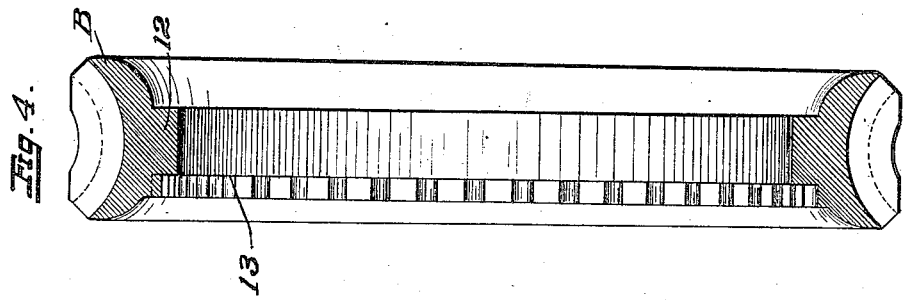
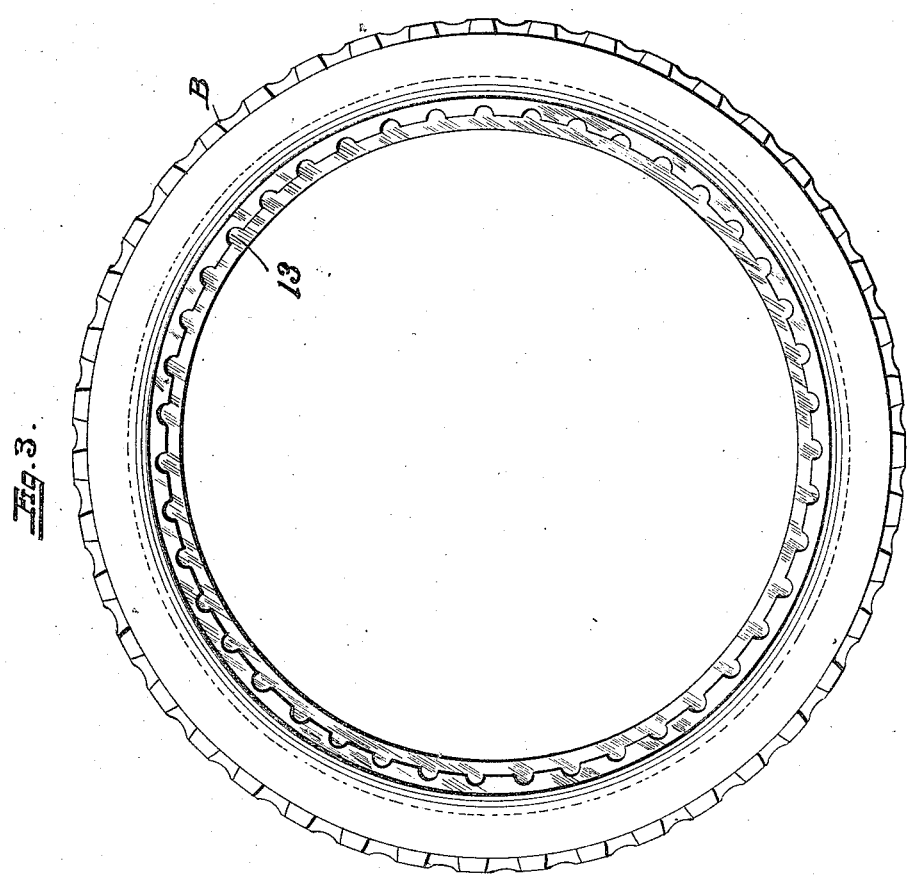
Inventor:
John W. White Jr.
By Strong & Townsend
Attorneys

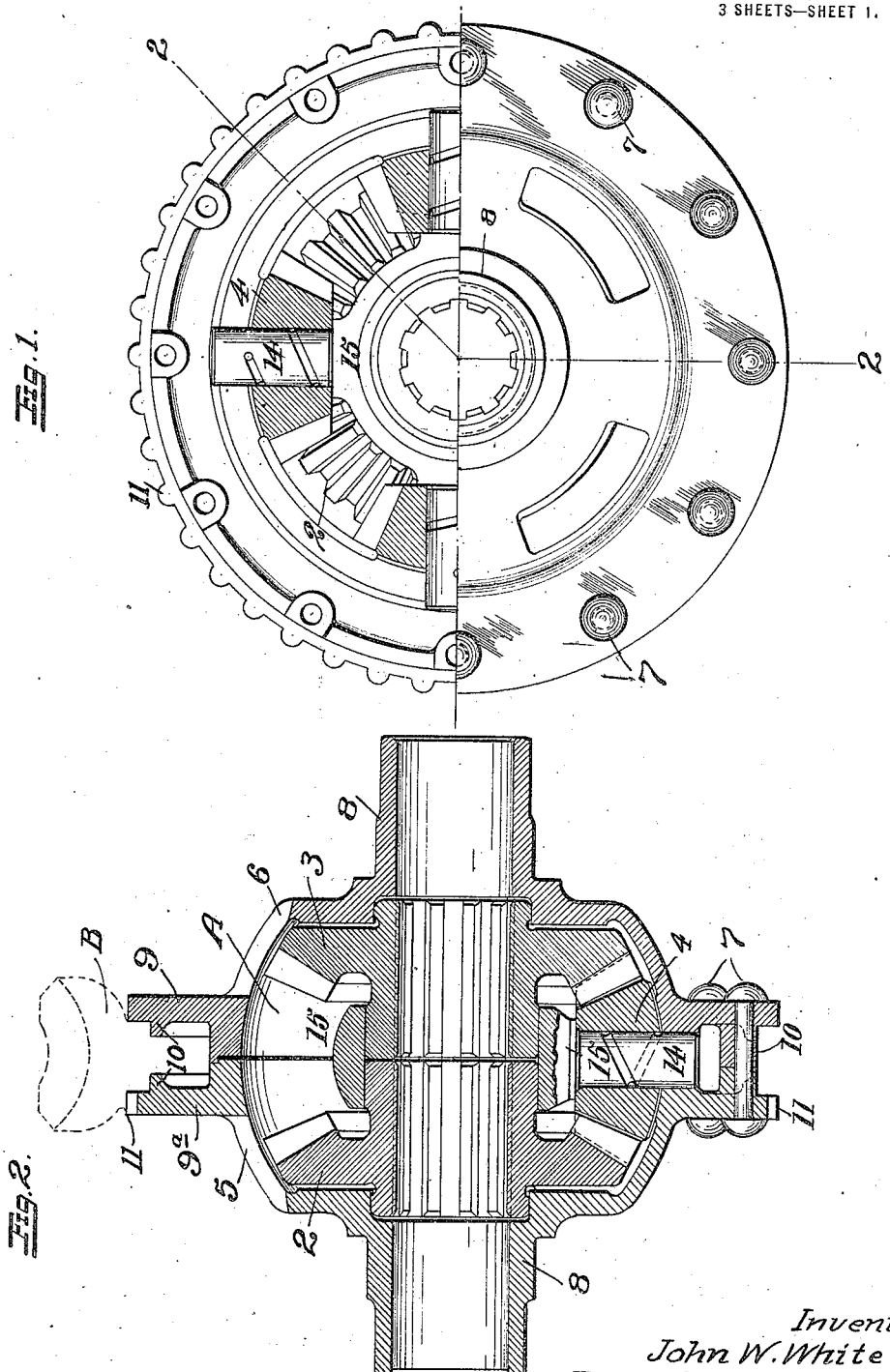

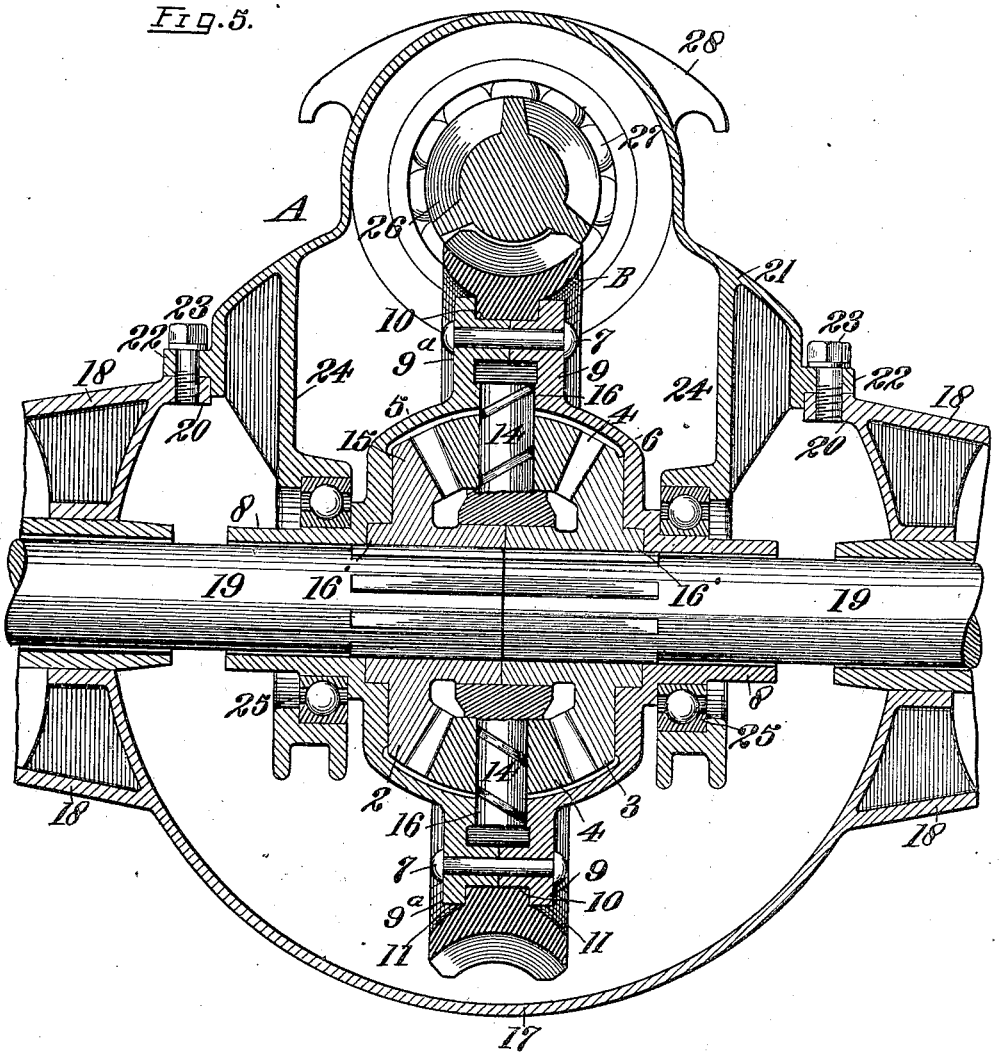

UNITED STATES PATENT OFFICE.

JOHN W. WHITE, JR., OF OAKLAND, CALIFORNIA.

BRONZE WORM-GEAR MOUNTING.

1,422,512.  Specification of Letters Patent.  Patented July 11, 1922.

Application filed May 28, 1919. Serial No. 300,299.

*To all whom it may concern:*

Be it known that I, JOHN W. WHITE, Jr., a citizen of the United States, residing at Oakland, in the county of Alameda and State of California, have invented new and useful Improvements in Bronze Worm-Gear Mountings, of which the following is a specification:

This invention relates to gearing and more particularly to a differential gearing for motor vehicles, tractors or the like.

It has heretofore been known to transmit power to the differential and the rear driving axles of a motor driven vehicle by means of a worm gear drive, and further, it has been known to form the worm gear in ring form and of a metal different from that of the hub or web, such as a bronze ring gear and a steel hub or web. Considerable difficulty has, however, been encountered in securing the worm ring gear to the hub or web, due to the fact that the rivets or bolts by which the ring gear is secured to the web have a tendency to break or shear. This is caused by distortion of the bronze ring gear in relation to the web when the ring gear is heated by the driving worm, and also to sudden load shocks and road vibrations.

One of the objects of the present invention is to secure the ring gear to the web in such a manner that no strain will be thrown upon the rivets which secure it to the web, and in such a manner as to overcome the tendency of distortion when heated by the friction of the driving worm.

Another object of the invention is to provide a novel form of spline lock and mounting which carries the torsional load transmitted to the ring gear, and which permits the gear web to form a unit housing construction for the differential gearing, the parts forming the unit co-acting one with the other to adequately support and retain all parts in their proper relative positions, which is not only important from an assembly standpoint, but also has direct advantages in regard to lightness of construction, and the assistance of each part in general to strengthen and position the mating parts.

Further objects will hereinafter appear and objects relating to economics of manufacture and details of construction and assembly.

The invention consists of the parts and the construction and combination of parts as hereinafter more fully described and claimed, having reference to the accompanying drawings, in which—

Fig. 1 is a side elevation of the differential gearing partly in section.

Fig. 2 is a transverse section of the differential gearing.

Fig. 3 is a side elevation of the worm ring gear, and

Fig. 4 is a cross section of the same.

Fig. 5 is a section similar to Fig. 2 and additionally showing the outer housing and carrier for supporting the differential gearing in said housing.

Similar reference numerals refer to similar parts throughout the several views.

Referring to the drawings in detail, A indicates, in general, the differential; B the worm ring gear forming part thereof; and 2, 3 and 4, the differential gears and pinions.

By referring to Figs. 1 and 2, it will be seen that the differential web consists of two sections as shown at 5 and 6. These sections are secured together by means of rivets 7, or other suitable means, and together they form a housing for the differential gears and pinions as hereinafter explained. Each section is provided with an extending bearing hub 8 and an annular peripheral flange 9 for the reception of the worm ring gear B. Formed on the inner face of each flange 9 is an annular seat 10, and formed on the periphery of the flange shown at $9^a$ are a series of semi-circular splines or teeth as shown at 11, and similarly formed on one side of an inwardly projecting rim 12 formed on the ring gear B are a series of key grooves 13 for the reception of the keys or splines 11.

In actual practice when assembling the differential it can readily be seen that the ring gear B is first placed in position on the flange 9 of the housing section 6, it being retained in position on the said flange by the annular inwardly projecting seating rim 10. The gears 2 and 3 and the pinions 4 are next placed in position, and the housing section 5 is then applied. The splines or teeth 11 will then enter the key grooves 13 formed in the ring gear, and will thus secure the same against turning movement between the flanges 9 and $9^a$, or about the seating rims 10. The rivets shown at 7 are then applied, completing the structure.

By referring to Figs. 1 and 2, it can readily be seen that the entire torsional strain transmitted to the worm ring gear B is taken up by the semi-circular splines or teeth 11, and that, practically speaking, no strain is transmitted to the rivets 7, as they do not pass through any portion of the ring gear, but merely through the flanges 9 and 9ª of the respective housing sections. Distortion due to the heat created by the friction of the driving worm is also overcome, as the ring gear B is free to expand or contract without transmitting any strain to the rivets 7.

It must be noted that the pinions 4 are mounted on studs 14 projecting radially from a center hub 15, said studs being shown as four in number, and received in sockets 16 formed in the sections 5 and 6 whereby the studs and the center hub are securely held in position with the pinions 4 on said studs, and further, the hubs of the gears 2 and 3 project outwardly and have a bearing as at 16' in the sections 5 and 6. The general arrangement of the sections 5 and 6, forming as they do the web of the ring gear, are thus reinforced by a second arrangement of center hub which is practically a hub with the studs extending radially therefrom in the nature of spokes, and withal this combination is so arranged that the gears 2 and 3 and pinions 4 are enclosed and retained in their proper working positions in a most secure and efficient manner with the several bearing surfaces thereof each arranged to co-act with the other, whereby the necessary parts are reduced to a minimum and the thrust and torsional strains efficiently equalized.

Now referring to Fig. 5, 17 indicates the usual bowl casting for housing the differential gear unit, and 18, the opposed axle housings extending therefrom in which the axle sections 19 are suitably journaled. The bowl 17 is provided with a seating flange 20 for seating the carrier or cover 21, the cover being also provided with a cooperating seating flange 22. Bolts 23 secure the cover to the bowl. On the inner wall of the cover are provided a pair of downwardly extending arms 24 and in the lower ends of which the hub bearing portions 8 of the differential housing sections 5 and 6 are journaled by ball bearings 25. The upper part of the carrier or housing is semi-cylindrical in shape and adapted to house the worm driving gear indicated at 26. The shaft carrying said gear is suitably journaled by ball bearings in the end walls of said semi-cylindrical housing portion of the carrier, one of the ball bearings being indicated at 27. Ears 28 are provided on the cover, whereby, after removing the bolts 23 and the axle sections 19, the entire differential unit assembly may be removed from the housing.

When assembling, the axle sections are inserted from either end into the corresponding extending bearing hubs 8 and the splined hubs of the differential gears 2 and 3; thus said shaft ends further serve to support the extending hubs 8 and the hubs of the differential gears 2 and 3 in proper alignment and running position.

Several important advantages are obtained by the structure here shown in addition to those already specified; for instance, the flanges 9 and 9ª serve as means for locking the ring gear against lateral movement with relation to the housing sections. The structure furthermore permits the ring gear to form a unit construction with the sections 5 and 6 to complete a differential housing, thus increasing its strength and assisting in retaining all parts in their proper relative positions, which is not only an advantage from an assembly standpoint but also lightness of construction and the assisting of each part in generally strengthening and positioning the cooperating parts. Many difficulties of assembly and operation are entirely obviated by the structure shown, and a more rigid substantial structure and mounting is obtained with fewer parts than has heretofore been possible.

While the mounting is here shown as applied to a differential, I wish it understood that other applications of the invention are equally feasible, and that the materials and finish of the several parts employed in the application thereof for different uses may be such as the experience and judgment of the manufacturer may dictate.

Having thus described my invention, what I claim and desire to secure by Letters Patent is:—

1. The combination with a two-piece differential housing, of an annular flange carried by each section of said housing, and an annular seat member formed on each flange and of a diameter less than the same, of a ring gear adapted to be received by said seat and embraced by the said flanges, a series of spline members formed on the circumferential edge of one of the flange members, and recesses formed in the side of the ring gear similar in number and location to the spline members for the reception thereof to secure the ring gear from circumferential movement about the housing.

2. The combination with a two-piece sectional differential housing, of an annular seat member formed on each housing section, a gear adapted to be received by said seat members and supported thereby, an annular flange carried by each housing section adapted to embrace the sides of the gear and secure it against lateral movement on the housing, means for securing the two housing sections together, a series of spline members formed circumferentially of one of the housing sections, and a series of key or spline grooves formed in the side of the gear for the reception of the spline to secure the gear against circumferential movement about the housing sections.

3. The combination with a two-piece sectional differential housing, of an annular seat member formed on each housing section, a gear adapted to be received by said seat members and supported thereby, an annular flange carried by each housing section adapted to embrace the sides of the gear and secure it against lateral movement on the housing, means for securing the two housing sections together, a series of interspaced spline members formed in the peripheral flange of one of the housing sections, said splines being semi-circular in cross section, and a series of similarly shaped key or spline grooves formed in the side of the gear for the reception of the splines to secure the gear against circumferential movement about the housing sections.

4. The combination with a two-piece sectional differential housing, of an annular flange member carried by each section of said housing, a gear adapted to be secured between said flanges, an inwardy projecting rim on said gear, the lateral dimensions of said rim being less than the face of the gear and adapted to pass between the flanges, an annular seat member less in diameter than and carried by each housing flange for the reception of the rim, means passing through the annular flanges of the housing sections to secure the said sections together and to clamp the rim of the gear between the flanges and on the seat members, and spline members formed at the circumscribing edge of the flanges and in mesh with corresponding recesses formed in the side of the gear above the rim, to lock the gear against circumferential movement between the flanges.

5. The combination with a two-piece sectional differential housing of an annular flange member carried by each housing, a gear adapted to be secured between said flanges, an inwardly projecting rim on the gear adapted to pass between the flanges, an annular seat member carried by each housing flange for the reception of the rim, means passing through the annular flanges of the housing sections to secure the said sections together, and to clamp the gear between the annular flanges, a series of interspaced spline grooves formed in the rim of the gear at one side thereof and a series of splines formed on the outer circumferential edge of one of the flanges adapted to enter the spline grooves on the gear to secure the same against circumferential movement between the flanges.

6. In combination with a differential assembly comprising an outer housing formed in two sections and a differential gearing unit, of annular flanges formed on adjacent faces of the sectional housing, annular seating members formed on each flange and of a diameter less than the same, a ring gear comprising a toothed rim having an annular rib of a less lateral dimension formed centrally of and projecting inwardly from the inner face of the rim, the said annular rib adapted to seat on the seat members and be embraced by the annular flanges, a series of recesses formed in the rim at one side thereof above the rib, a series of spline members formed on the circumscribing edge of one of the flanges and like in shape and location to the recesses in the gear so as to engage the same and lock the gear from circumferential movement between the flanges, and means passing through the flanges and securing the same together and clamping the annular rib of the gear.

In testimony whereof I have hereunto set my hand in the presence of two subscribing witnesses.

JOHN W. WHITE, Jr.

Witnesses:
H. A. McMillan,
L. H. Gaylord.